April 18, 1967　　　R. P. LUCAS　　　3,315,132
BUSBAR POWER DISTRIBUTION SYSTEMS
Filed Aug. 30, 1965　　　　　　　　　　　　2 Sheets-Sheet 1
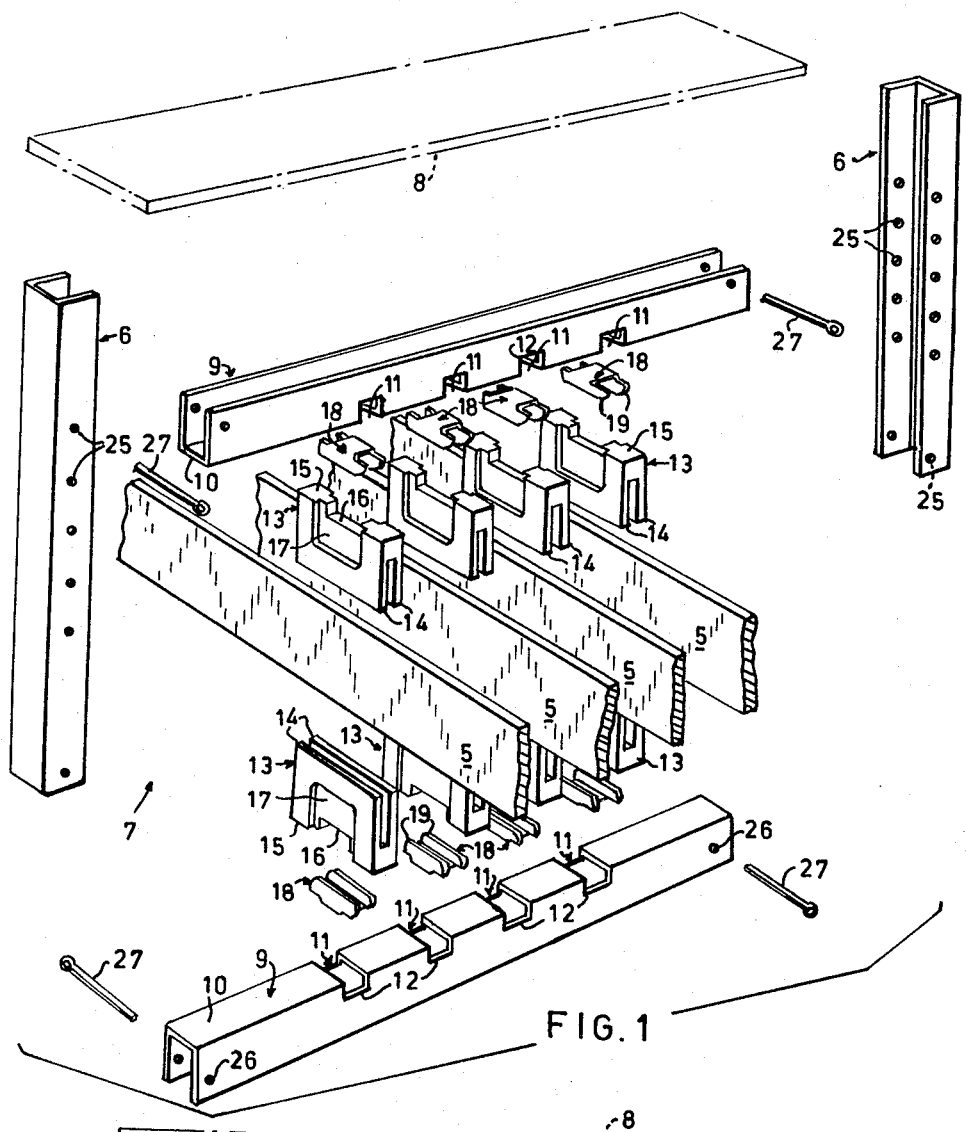
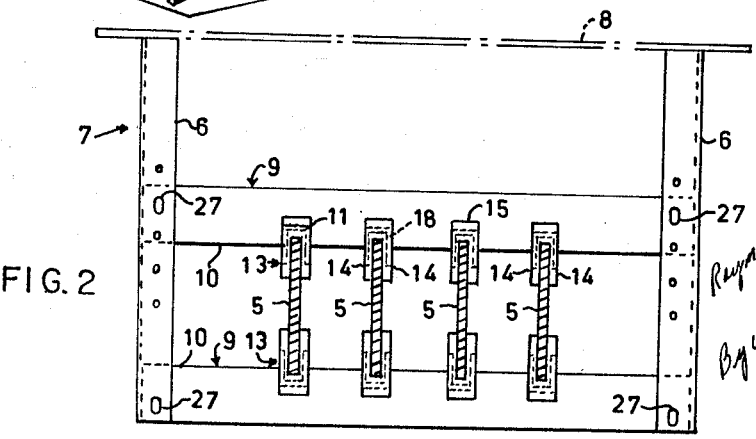

April 18, 1967  R. P. LUCAS  3,315,132
BUSBAR POWER DISTRIBUTION SYSTEMS
Filed Aug. 30, 1965  2 Sheets-Sheet 2

United States Patent Office 3,315,132
Patented Apr. 18, 1967

3,315,132
BUSBAR POWER DISTRIBUTION SYSTEMS
Raymond Peter Lucas, Leichhardt, New South Wales, Australia, assignor to Johnson & Phillips (Australia) Proprietary Limited, Liverpool, New South Wales, Australia, a corporation of Australia
Filed Aug. 30, 1965, Ser. No. 483,499
Claims priority, application Australia, Oct. 9, 1964, 50,320/64
9 Claims. (Cl. 317—99)

This invention relates to power distribution systems, particularly those of heavy duty type. Throughout this specification the systems in point will be referred to as busbar power distribution systems although the commonly known vertical rising main systems are intended to be included within the meaning of this term.

Prior systems of the above kind which may be either partially or totally enclosed and vertically or horizontally extending are usually expected to make available to electrical machinery exceedingly large electric currents of up to about 3,000 amperes per phase. Quite frequently with the existing systems severe damage occurs both to the electrical conductors and their supporting insulators under the conditions of short circuit which imposes very severe distortion stresses upon the system. It is invariably impossible, automatically to break the circuit sufficiently fast to avoid this damage when a short circuit condition occurs. Due to this phenomenon mounting insulators for busbar conductors which are sufficiently strong to withstand these stresses have added considerably to the bulk and cost of the system.

It is a main object of the invention to provide a busbar power distribution system which incorporates a comparatively inexpensive method of support for the busbar conductors which are sufficiently strong to withstand the normal stresses of short circuit conditions within the system.

The invention in a general form provides a busbar power distribution system, particularly of the heavy duty type, comprising a plurality of substantially flat, parallel extending strips of metal conductors for the electric power, supporting frames at spaced intervals along the length of the conductors, a pair of confronting metal arms on each frame, pairs of confronting notches in respective ones of the arms, said arms being relatively positioned to permit the conductors to extend between them with their transverse axes intersecting the longitudinal axis of each arm, electrical insulating elements each seated in a notch, and a socket in each insulating element in which is edge mounted a respective conductor.

Preferred forms of the invention are illustrated in the accompanying drawings, in which:

FIG. 1 is an exploded perspective view of the component parts associated with one supporting frame in which a first form of insulating element is used;

FIG. 2 is a side elevation of the supporting frame shown in FIG. 1 with the other component parts assembled thereon;

Figure 3:
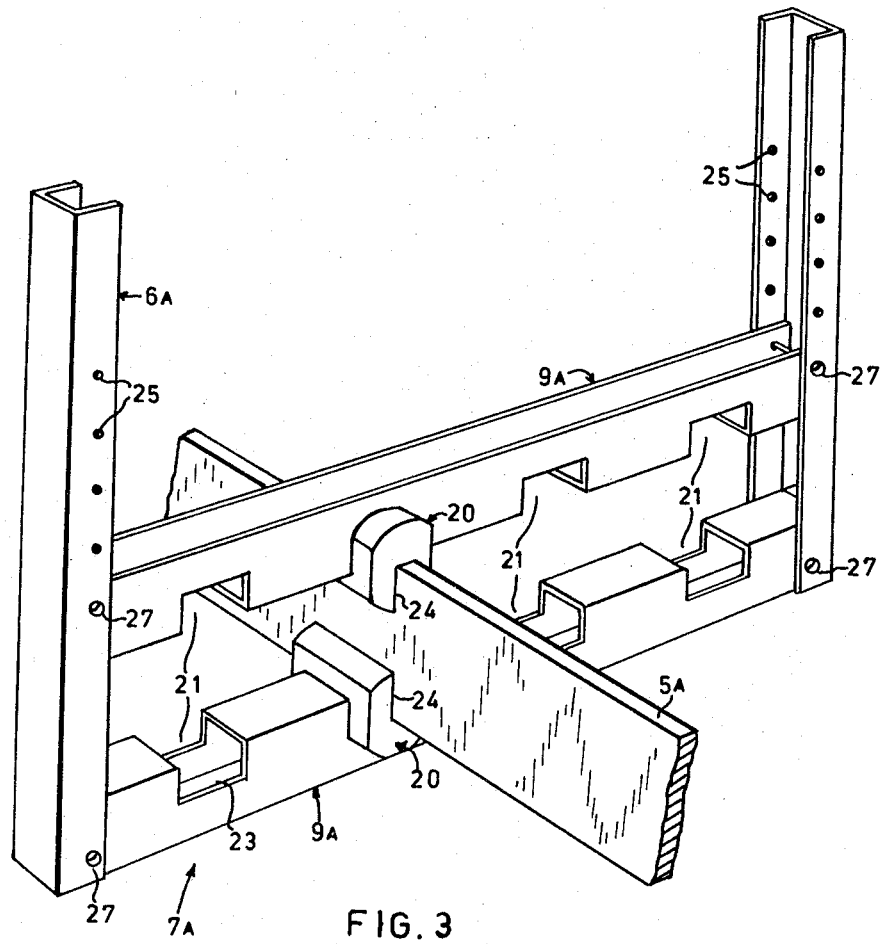
FIG. 3 is a perspective view of a supporting frame showing a single conductor secured thereon by an alternative form of insulator.

In the two forms of the invention shown in FIGS. 1 and 2, and 3 and 4, the power distribution system is of the exposed type horizontally suspended either through a number of power bays or in the common overhead fashion. In either case four electrical conductors 5 are usually provided in suitable lengths with the entire power run composed of multiple sections of these bars 5 bolted together end on end. The conductors of the set of four conductors 5 are each edge mounted and extend in parallel along the power run.

Each individual conductor 5 may be composed of a single busbar, as illustrated, or multipled busbar represented by like bars of hard drawn high conductivity copper. According to the former type only, of course, a single bar 5 serves as any individual conductor while the latter type may utilize several closely spaced bars. The optimum spacing and that which is usually applied is approximately ¼ inch.

For obvious benefits of mass production the preferred form to be described includes such a construction of components as to obtain the full value of universal form thereof between several modified systems which may be produced. Particularly has this consideration been applied to the construction of the insulating means due to the large numbers required for a single system.

For the horizontal suspension of the conductors a metal frame is provided which is composed of a pair of suspending vertical stiles 6 forming part of a supporting framework attached by one end to a mounting base 8. A plurality of such frames 7 are located at intervals along the power run. A pair of confronting arms mounted as spaced rungs 9 between the pair of stiles 6 serve to hold the conductors 5 in position. In accordance with this embodiment the supporting frameworks 7 are referred to as providing for suspension of the conductors 5 but it will be apparent that the stiles 6 of the framework 7 would be secured in a horizontal position if the invention were to be applied to a vertical rising main system.

The set of conductors 5 pass between the rungs 9 of the framework 7 in edge mounted formation and the spacing between the rungs 9 is less than the width of the conductors 5. Both the stiles 6 and rungs 9 of the framework 7 are formed from channelled metal or other suitable material. When constructed of channelled metal the rungs 9 are arranged with the underside of their bases 10 in confronting relationship. A series of four notches 11, preferably of a square slotted shape are made through the base 10 and flanges of each rung 9 and are so positioned that confronting pairs of these notches 11 correspond in position with respective ones of the conductors 5. The spanning distance between the inner ends 12 of any pair of notches 11 is greater than the width of its respective conductor 5.

Electrically insulating sheaths 13, preferably of nylon but also suitably of Bakelite, ebonite or such, are provided which seat within the notches 11. Where a system of single busbar construction is involved the notch 11 is of such width as to accept as a snug fit a single sheath 13. Where multiple bars are in use (not shown) the notch will be made of greater width snugly to hold a plurality of like sheaths.

Each insulating sheath 13 is moulded with a pair of parallel side plates 14 upstanding from a rectangular base block 15 so as to form between them a socket for a conductive bar 5. A rectangular slot 16 is formed in the underside of the base 15, i.e. the face opposite that from which the side plates 14 extend. A shallow recess 17 is made in each side face of the base 15 and extends into portion of the respective side plate 14. A sheet metal bracket 18 bent U-shaped is fitted within the base slot 16 with its side walls 19 seated within the shallow recesses 17. Each sheath 13 is thus made to fit within a notch 11 in a rung 9 so that its attached bracket 18 is in firm contact with the metal of the supporting rung 9 and the underedge of its base 15 is beyond the inner end 12 of the notch 11.

Figure 4:
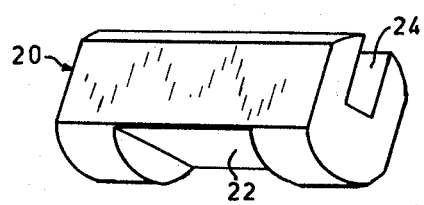
FIG. 4 is an enlarged perspective view of the insulator used in FIG. 3.

The thickness of each side plate 14 of a sheath 13 is approximately ⅛ inch so that a pair of juxtaposed sheaths 13, supporting respective edge mounted bars 5 between their side plates 14, permits the desired ¼ inch spacing of multipled bars. On the other hand the area of the side plates 14 of the sheaths 13 is so designed to prevent voltage leakage around the insulating sheaths 13 from the busbars 5 to the metal supporting rungs 9. Furthermore besides obtaining the electrical insulating properties of the nylon sheath 13 the strength of the metal in the rung 9 is employed for resisting the short circuit overload forces. The metal brackets 18 in one respect serve to distribute the otherwise shearing force which would be imposed under short circuit conditions between the edges of the notches 11 and the respective busbar conductor 5 over a relatively large area of the sheaths 13.

Where the high degree of uniformity of construction described above is relatively unimportant the insulating elements may be insulation blocks 20, as shown in FIGS. 3 and 4 seated within respective notches 21 and preferably of a snug fit therein. A slot 22, see FIG. 4, is formed in one face of each insulator 20 which will register with the inner end of its respective notch 21 to enable the insulating block 20 to seat over the rim 23 of metal at the inner end of the notch 21. A pair of longitudinal confronting slots 24 are provided in each pair of blocks within which the opposite lateral edge portions of the respective conductor 5A may be seated.

With the above mounting arrangement, it will be seen that the lateral edges of the conductors 5A are mounted within their insulators 20 at a level within the base of the rungs 9A of each framework 7A so that distorting stresses tending to force the conductors 5A apart will be resisted by the strength of the metal in the base of the rungs 9A. Thus, the insulating properties of the insulating block 20 are utilized while the far greater strength of the metal of the rungs 9A serves to support the conductors against distortion stresses. The arrangement is such that relatively inexpensive insulating blocks 20 are used with greater supporting strength than has hitherto been possible.

As one form of connection between the stiles 6 or 6A and the rungs 9 or 9A of the supporting framework 7 or 7A the rungs may be formed of metal of smaller channel sections than the stiles. A series of perforations 25 may be provided along the length of the opposite side flanges of each stile 6 or 6A with a single perforation 26 (FIG. 1) in the flanges near the end of the two rungs 9 or 9A. In this way both the spacing between the rungs 9 or 9A and the level of suspension of the conductors 5 or 5A may be readily adjusted by the use of locking pins 27 passed through the perforations 26 in the rungs 9 or 9A and selected registering perforations 25 in the stiles 6 or 6A.

A preferred embodiment and various other forms have been described in the foregoing passages but it is to be understood that other forms of the system are also possible within the scope of this invention.

What I claim is:

1. A busbar power distribution system, particularly of the heavy duty type, comprising a plurality of substantially flat, parallel extending strips of metal conductors for the electric power, supporting frames spaced at intervals along the length of said conductors, a pair of confronting metal arms on each frame, pairs of confronting notches in said arms, said arms being relatively positioned to permit said conductors to extend between said arms with their transverse axes intersecting the longitudinal axis of each arm, a separately insertable electrical insulating element seated in each of said notches having a socket confronting a socket in the separately insertable insulating element in a notch of the other arm in which is edge mounted one of said conductors.

2. A system according to claim 1, wherein said sockets are slots in said insulating elements having their inner ends recessed within said notches, and the spacing between said arms is less than the width of said conductors.

3. A system according to claim 1, wherein each insulating element has a base and a recess therein so that portions of said base enclose part of the body of the respective arm beyond the notch cooperating with said element.

4. A system according to claim 1, wherein each of said frames includes a pair of spaced parallel channeled stiles, and said arms are spaced parallel channelled strips having their ends connected to said channelled stiles, means for adjustably spacing said arms on said stiles, the spacing apart of said arms being less than the width of said conductors.

5. A busbar power distribution system, particularly of the heavy duty type, comprising a plurality of substantially flat, parallel extending strips of metal conductors for the electric power, supporting frames spaced at intervals along the length of said conductors, a pair of confronting metal arms on each frame, pairs of confronting notches in said arms, said arms being relatively positioned to permit the conductors to extend between them with their transverse axes intersecting the longitudinal axis of each arm, electrical insulating moulded sheath elements each seated in one of said notches, each sheath element having side flanges between which the longitudinal edge of the respective conductor is located, and a U-shaped metal bracket seated within each of said notches to hold said sheath element in said bracket.

6. A system according to claim 5, wherein said side flanges of each sheath have lateral recesses to accommodate said bracket.

7. A system according to claim 6, wherein the notch in each arm is large enough to mount a plurality of juxtaposed moulded sheaths and their brackets.

8. A system according to claim 7, wherein each of said supporting frames includes a pair of spaced parallel channelled stiles, and said arms are spaced parallel channelled strips having their ends connected to said channelled stiles, means for adjustably spacing said arms on said stiles, the spacing apart of said arms being less than the width of said conductors.

9. A busbar power distributor system, particularly of the heavy duty type, comprising a plurality of flat parallel strips of metal conductors for conveying the electric power from a supply source to a distribution position, a plurality of supporting frames spaced at intervals along the run of said conductors, each being composed of a pair of spaced stiles of channelled metal anchored by one end with their channels confronting and having rows of perforations along their lengths, spaced parallel arms bridging said stiles comprising strips of U-section channelled metal mounted with their flat bases confronting one another, each of said arms having a perforation adjacent each end, pins cooperating with said perforations in said stiles corresponding to selected spaced positions of said arms and said perforations in said arms to secure said arms and stiles together, each of said arms having notches formed as rectangular slots relatively positioned in opposite arms in confronting pairs, a moulded electrically insulating element tightly fitted in each notch, a longitudinal slot in each confronting face of each pair of insulating elements, and a medial recess in the opposite face, forming the base, of each insulating element to permit it to seat over the inner end of its respective slot, a respective one of said metal conductors being supported by opposite longitudinal edge portions in each pair of insulating elements, the selected spacing of said arms being less than the width of the metal conductors.

References Cited by the Examiner

UNITED STATES PATENTS 2,966,540  12/1960  Christensen _____ 174—99 X

ROBERT K. SCHAEFER, *Primary Examiner.*

M. GINSBURG, *Assistant Examiner.*